Figure 1:
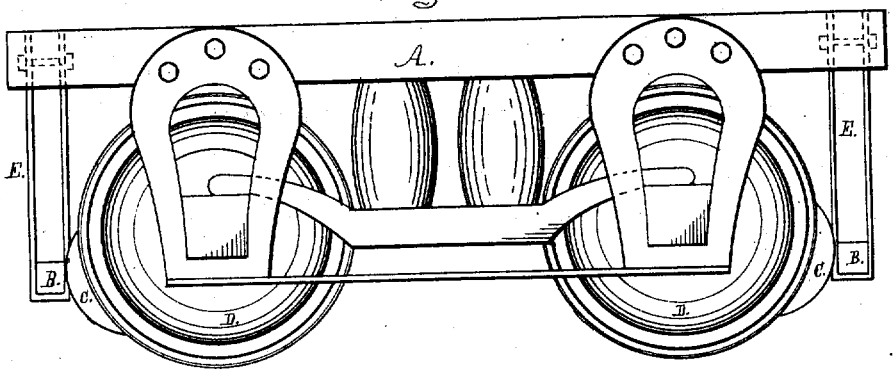

J. DAVIS.

CAR-BRAKE HANGER.

No. 7,313.

Reissued Sept. 19, 1876.

Witnesses

James S. Johnston

A. J. Davis

Inventor

John Davis,

By Johnston & Donn.

his attorneys

N. PETERS, PHOTO-LITHOGRAPHER, WASHINGTON, D. C.

UNITED STATES PATENT OFFICE.

JOHN DAVIS, OF ALLEGHENY, PENNSYLVANIA.

IMPROVEMENT IN CAR-BRAKE HANGERS.

Specification forming part of Letters Patent No. 55,067, dated May 29, 1866; reissue No. 3,532, dated July 6, 1869; reissue No. 7,313, dated September 19, 1876; application filed July 11, 1876.

DIVISION B.

*To all whom it may concern:*

Be it known that I, JOHN DAVIS, of the city and county of Allegheny, in the State of Pennsylvania, have invented a certain new and useful Improvement in Brakes for Railway-Cars, which was shown in the drawings forming part of Letters Patent No. 55,067, granted to me May 29, 1866, and subsequently reissued July 6, 1869, No. 3,532, which improvement I now desire to secure in a separate patent, as provided for by the act of Congress; and I do hereby declare that the following is a full, clear, and exact description thereof, reference being had to the accompanying drawings, and to the letters of reference marked thereon.

In division B, my invention consists, first, in inclosing the brake-bar of railway-car brakes in stirrups suspended to the car or its truck; and second, in suspending and inclosing the brake-bar of railway-car brakes to the car or its truck through the medium of stirrups, for the purpose of greater safety, by avoiding the danger common to the dropping of the brake-bar upon railway-track.

To enable others skilled in the art with which my invention is most nearly connected to make and use it, I will proceed to describe its construction and operation.

Figure 2:
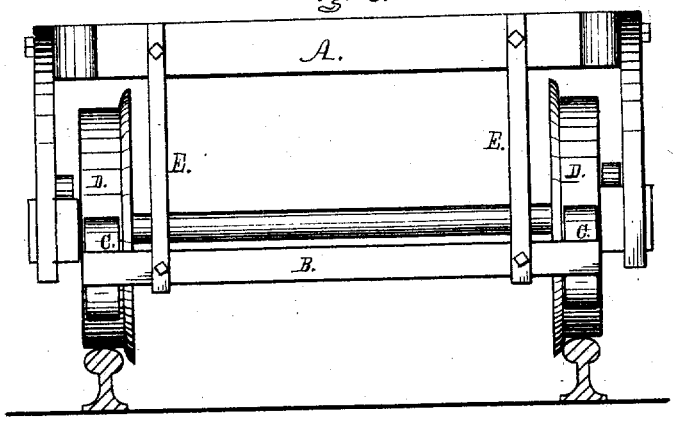

In the accompanying drawings, which form part of my specification, Figure 1 is a side view of an ordinary truck for a railway-car provided with my improvement for inclosing the brake-bar, and for suspending it to the car-truck. Fig. 2 is an end elevation of the same.

The ordinary manner of suspending the brake-bar of railway-cars is to secure in the brake-bar, near each end of it, a bolt having a ring or eye, into which is looped one end of a round bar or link, of suitable length, and the other end of said bar or link is looped in a ring of a bolt secured in the frame of the car-truck. Another method of suspending the brake-bars is suspending them by means of flat bars of iron, or by chains. These methods are objectionable, for if either of the bars or chains used for suspending the brake-bars should break off or otherwise become detached, (which is often the case,) then the brake-bar will drop down on the track, and is very liable to throw the car or train off the track, causing a "smash-up," accompanied, often, by loss of life and injury of passengers, and always with a loss of property. Now, by suspending the brake-bars in stirrups, as shown in the accompanying drawings, the brake-bars will be more securely suspended to the car or truck frame, and the liability of accidents caused by the brake-bars dropping down on the track is avoided.

In the accompanying drawings, A represents the truck of a railway-car, and is of ordinary construction. B represents the brake-bar, to which are attached the brake-shoes C, which act on the tread of the wheels D. The brake-bars B are suspended to the car or its truck by means of stirrups E, which incloses the brake-bars, so as to prevent it from falling on or across the railway-track. The brake-bars B are inclosed and suspended by the stirrups E; but it will be readily seen that the brake-bars may be suspended by the ordinary means of chains, links, or bars, and then inclosed by stirrups, as shown in the accompanying drawings, and the result hereinbefore described be obtained.

Having thus described my improvements, what I claim as of my invention is—

1. The brake-bars B, inclosed in stirrups E E, the latter attached to the truck-frame A, substantially as herein described, and for the purpose set forth.

2. The stirrups E E, constructed and arranged as herein described, to inclose and suspend the brake-bar, as and for the purpose set forth.

JOHN DAVIS.

Witnesses:
JAMES J. JOHNSTON,
A. J. DAVIS.